US006464916B2

(12) United States Patent
Tyson

(10) Patent No.: US 6,464,916 B2
(45) Date of Patent: *Oct. 15, 2002

(54) METHOD OF MANUFACTURING CURVED HOSE

(75) Inventor: Garth Alan Tyson, Sun Prairie, WI (US)

(73) Assignee: The Goodyear Tire & Rubber Company, Akron, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/569,997

(22) Filed: May 12, 2000

(65) Prior Publication Data

US 2002/0079608 A1 Jun. 27, 2002

(51) Int. Cl.[7] .................. B29C 47/20; B29C 47/88; B29C 53/08; B29D 23/00
(52) U.S. Cl. ................ 264/150; 264/103; 264/159; 264/209.3; 264/236; 264/295; 264/339
(58) Field of Search ............... 264/103, 150, 264/159, 209.3, 236, 295, 339

(56) References Cited

U.S. PATENT DOCUMENTS

| 4,104,098 A | | 8/1978 | Hush et al. ............. 156/149 |
| 4,106,967 A | * | 8/1978 | Logan et al. ............ 156/184 |
| 4,205,034 A | * | 5/1980 | Newberry ............... 264/103 |
| 4,242,296 A | | 12/1980 | Brucker ................. 264/149 |
| 5,941,286 A | | 8/1999 | Fauble et al. ........... 138/137 |

FOREIGN PATENT DOCUMENTS

| JP | 4250025 A | 9/1992 |
| JP | 04339638 A | 11/1992 |
| JP | 05200900 A | 8/1993 |

* cited by examiner

Primary Examiner—Leo B. Tentoni
(74) Attorney, Agent, or Firm—Nancy T. Krawczyk

(57) ABSTRACT

The present invention is directed to a method for manufacturing a curved hose. The method is comprised of the steps of forming a hose pre-assembly, partially curing the hose on a linear mandrel, and then completing the curing of the hose pre-assembly on a curved mandrel.

2 Claims, 1 Drawing Sheet

METHOD OF MANUFACTURING CURVED HOSE

FIELD OF THE INVENTION

The present invention is directed towards a method for manufacturing hoses. More specifically, the present invention is directed towards a method for manufacturing finite length curved hoses.

BACKGROUND OF THE INVENTION

Rubber hoses of curved shape are required in a variety of applications. One example of an application for a curved hose is in automotive radiators. Typically curved hoses are manufactured by extruding a rubber core layer, applying a reinforcement layer over the core layer, and extruding a cover layer over the reinforcement layer to form an indefinite length hose. The uncured hose length is cut to finite lengths and placed manually on rigid mandrels having the shape of the desired finished hose configuration. The mandrels and the uncured hose assemblies are placed in vulcanization units. The lengths of hose are vulcanized on the mandrels in the desired configuration. The finished hoses are removed from the mandrels.

This conventional method of manufacturing curved hoses is very labor-intensive. The desired final hose configuration often requires three-dimensional routing of the hose length. The hose lengths are manually inserted onto and removed from the rigid mandrels. For complex curved hoses, more than one person is often required to insert and remove the hose lengths on and off of the rigid mandrels. While mandrel lubricants are employed, loading and unloading the hose may cause the interior walls of the hoses to rip or tear.

U.S. Pat. No. 4,242,296 discloses a method for producing curved hoses. This method relies upon the use of deformable mandrels and spacers between the mandrels. This disclosed method does not make use of conventional mandrels currently used in manufacturing hoses and requires the additional expense of the spacers that are destroyed with each pair of curved hose manufactured.

U.S. Pat. No. 4,104,098 discloses a method for producing hose. After the hose assembly is prepared, the hose is partially cured in such a manner so that only the inner surface of the hose core is cured prior to applying a reinforcement means, and the remaining layers of the hose. This disclosed method is more times intensive than the present invention, and due to lack of forming the hose core on a mandrel, only relatively lower pressure hoses can be produced by this method.

SUMMARY OF THE INVENTION

The present invention is directed to a method for manufacturing a curved hose. The method is comprised of the steps of forming a hose pre-assembly, partially curing the hose on a linear mandrel, and then completing the curing of the hose pre-assembly on a curved mandrel.

In another aspect of the disclosed method of manufacturing curved hoses, the hose pre-assembly is prepared as an indefinite hose length on a flexible linear mandrel. After partially curing the hose pre-assembly, the hose pre-assembly is cut into fixed lengths. The hose lengths are cured on rigid curved mandrels to form curved hose lengths.

BRIEF DESCRIPTION OF THE DRAWINGS

The invention will be described by way of example and with reference to the accompanying drawings in which.

DETAILED DESCRIPTION OF THE PREFERRED EMBODIMENTS

Figure 1:
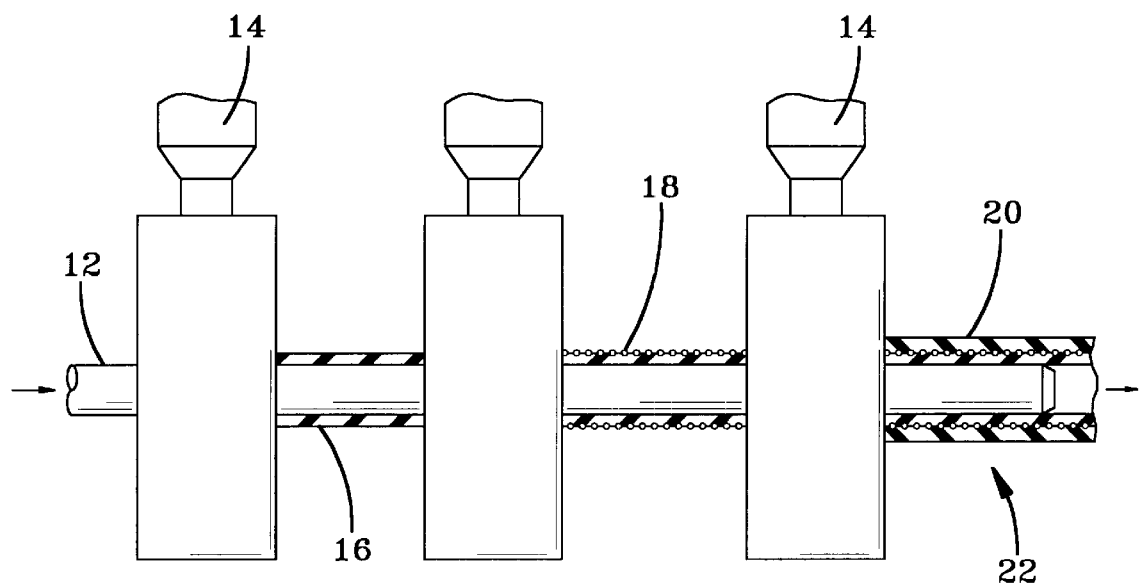
FIG. 1 illustrates the construction of the hose assembly.
Figure 2:
FIG. 2 illustrates steps in the construction of the finite hose length.
Figures 3, 4:
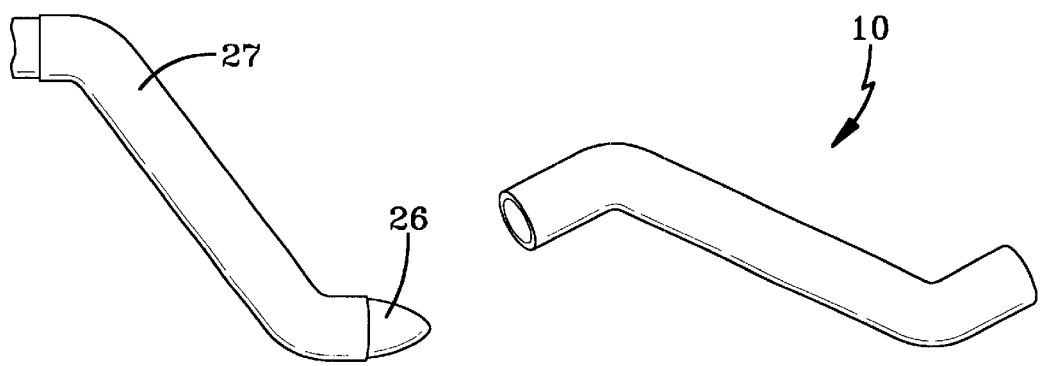
FIG. 3 illustrates a finite hose length on a fixed mandrel.
FIG. 4 illustrates a cured curved hose.

FIG. 1 illustrates the first phase of the inventive manufacturing process for producing curved hose (10). A flexible mandrel (12) is fed into an extruder (14) wherein a hose inner core (16) is extruded over the mandrel (12). By initially forming the hose (10) on a mandrel (12), higher working pressure hoses can be produced, versus conventional hoses which are not built on a mandrel. While only a single extruder (14) is illustrated, depending upon the engineering specifications of the finished hose (10), the hose inner core layer (16) may be constructed of several extruded layers. Similarly dependant upon the engineering specifications of the finished hose (10), the extruded core layer (16) may be formed from any thermoplastic or thermoelastic material, or in the case of multiple core layers, it may be combination of thermoplastic and thermoelastic extruded material.

After the core (16) is formed on the mandrel (12), reinforcement (18) is applied to the outer surface of the core (16). The reinforcement (18) may be spirally wound or braided onto the core (16). A cover layer (20) is then extruded over the reinforced core (16). One skilled in the art would readily appreciate that multiple layers of reinforcement (18) may be applied to the core (16), as well as required friction layers between the core (16) and the reinforcement layer (18). Any conventional material, such as aramid, polyester, nylon, cotton, glass, or steel, may be used as the reinforcement (18).

After the hose assembly (22) is complete, and while the hose assembly (22) is still on the flexible mandrel (12), the hose assembly (22) is partially cured. Conventional hose curing techniques, such as steam curing and continuous curing, may be used to achieve the partial curing.

After the partial curing, the mandrel (12) is removed from within the partially cured hose assembly. The mandrel (12) may be removed by hand or by mechanical automated means. Removal of the mandrel (12) is preferably achieved by mechanical means to reduce the labor required to produce the hose (10).

The partially-cured hose is then cut into finite lengths equivalent to the final length of the curved hose (10) required by the engineering specification for the curved hose (10). As hose lengths differ depending upon the desired end use of the hose (10), the indefinite partially-cured hose assembly may be cut into a variety of lengths.

The partially cured cut hose assemblies (24) are then inserted onto a rigid mandrel (26). The configuration of the rigid mandrel (26) corresponds to the desired configuration of the cured hose (10). Typically, sets of mandrels (26) are mounted on a moveable rack. A cut hose assembly (24) is inserted onto each mandrel (26) on the moveable rack. The mandrels (26) are then placed in a vulcanization chamber to complete the curing of the hose assemblies (24).

After curing has been completed, the hoses (10), while still on the mandrel (12), are preferably cooled in a water bath. The water bath also acts as a cleaning step for both the mandrel (26) and the cured hose (10). The hoses (10) are then removed from the mandrel (26). The finished curved hose (10) is ready for shipment.

By using the inventive process for manufacturing curved hose (10) the high manual labor required to produce a curved hose (10) is reduced in comparison to the known conventional methods of production. The inventive method also eliminates the step of trimming the hose edges as done with conventionally manufactured curved hose, reducing waste in the hose production.

What is claimed is:

1. A method for manufacturing a curved hose, the method comprising the following steps:

a) forming a hose pre-assembly on a linear mandrel;

b) partially curing the hose pre-assembly on the linear mandrel;

c) removing the partially cured hose pre-assembly from the linear mandrel;

d) cutting the partially cured hose pre-assembly into hose lengths;

e) inserting the hose lengths onto curved mandrels;

f) curing the hose lengths.

2. A method of manufacturing a curved hose in accordance with claim 1, the method being further characterized by the mandrel being a flexible mandrel.

* * * * *